H. E. RICHMOND.
LENS MOUNT.
APPLICATION FILED MAR. 1, 1909.
959,169.
Patented May 24, 1910.
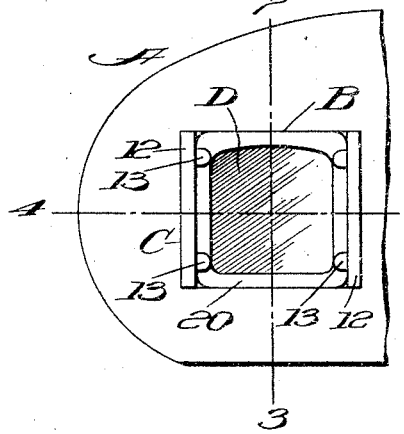
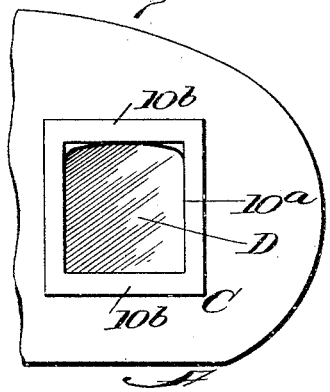
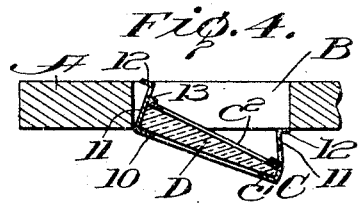
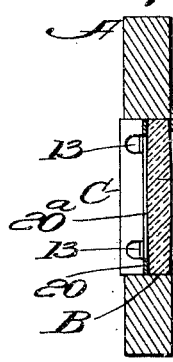
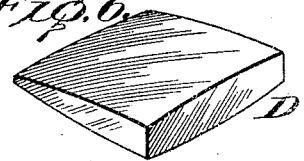
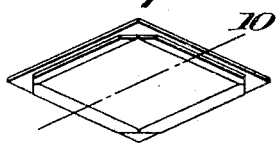
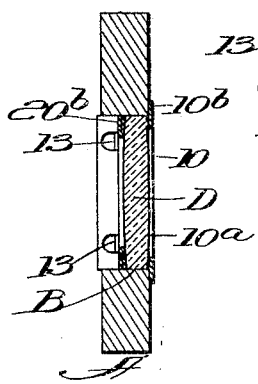
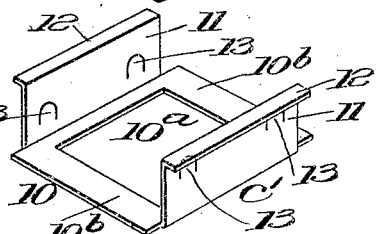
WITNESSES:
INVENTOR
H. E. Richmond
BY
ATTORNEY

UNITED STATES PATENT OFFICE.

HENRY E. RICHMOND, OF WESTWOOD, NEW JERSEY.

LENS-MOUNT.

959,169.  Specification of Letters Patent.  Patented May 24, 1910.

Application filed March 1, 1909. Serial No. 480,696.

*To all whom it may concern:*

Be it known that I, HENRY E. RICHMOND, a citizen of the United States, and a resident of Westwood, county of Bergen, and State of New Jersey, have invented certain new and useful Improvements in Lens-Mounts, of which the following is a specification.

My invention relates to certain novel features in the construction of lens mounts and especially those for use in stereoscopes.

One of the objects of my invention is to produce a simple mount that can be cheaply constructed and in which the lens may be quickly and securely fastened in place and the device taken apart in order to change or remove the lens when desired.

Other objects will appear from the hereinafter description.

Referring to the drawing in which the same reference character indicates the same part in the several views:

Figure 1 is a rear view of a portion of a lens frame with the lens mount in position. Fig. 2 is a front view of the same. Fig. 3 is a section on line 3 of Fig. 1. Fig. 4 is a section on line 4 of Fig. 1. Fig. 5 is a perspective view of one element of the mount. Fig. 6 is a perspective view of the lens used in the mount. Fig. 7 is a perspective view of a mat used in the mount. Fig. 8 is a sectional view similar to that of Fig. 3 showing a modified construction. Fig. 9 is a perspective view of the mat shown in said last mentioned figure. Fig. 10 is a section of said mat on line 10 of Fig. 9.

On the drawing the part marked A represents the lens frame showing one of the openings B therein for the lens mount C. The lens mounts consist of two elements $c'$ and $c^2$. The element $c'$ consists of a plate 10 having an opening $10^a$ therein and two sides 11 extending at right angles from the face thereof. Each end of the plate 10 projects beyond the edges of the sides 11 to form flanges $10^b$. The free ends of the sides 11 are turned at right angles to form the flanges 12. Each of said sides is slotted to form ears 13. The other element $c^2$ consists of the plate 20 having an opening $20^a$ therein corresponding to the opening $10^a$ in the element $c'$.

The lens D is placed in position between the sides 11 and the mat 20 is then placed over the lens and the ears 13 are turned down on the mat to hold the lens in position, as more clearly shown in Figs. 3 and 4. The lens as so mounted is inserted in the lens opening B in the frame in the manner shown in Fig. 4, and when in place, the flanges $10^b$ rest against one side of the lens frame and the flanges 12 rest against the other side, securely holding the lens mount in place.

In Figs. 8 to 10 I have shown a modified construction of mat. In this construction the mat is provided with inturned flanges $20^b$ which are formed integral with the mat proper. These turned flanges rest against the lens, and being of springy material, act as a resilient holder for the lens.

Having now described my invention, what I claim as new and desire to secure by Letters Patent is:

1. In a lens mount, a plate, sides formed integral with the plate, the ends of the plate projecting beyond the edges of the sides to form flanges, the free ends of the sides being outturned to form flanges, a lens resting against the plate and between the sides, another plate having an opening therein resting against the lens, and ears on the sides bearing against said second plate.

2. A lens mount consisting of a plate having an opening therein and two sides projecting therefrom, said plate projecting beyond the sides to form flanges, the free ends of the sides being outturned to form flanges, a lens resting against said plate and between the sides, another plate having an opening therein and flanges resting against the face of the lens, and ears on the sides and resting against the second mentioned plate to hold the lens in place.

In witness whereof I have hereunto set my hand at New York, county of New York and State of New York, this ninth day of February, 1909.

HENRY E. RICHMOND.

In presence of—
 E. W. ULMAN,
 JOHN J. RANAGAN.